United States Patent
Andrea

(10) Patent No.: US 11,586,669 B2
(45) Date of Patent: Feb. 21, 2023

(54) PROCESS FOR THE AUTOMATIC SELECTION OF DIGITAL PHOTOGRAPHS FROM AN ARCHIVE FOR THE AUTOMATIC CREATION OF A SELECTION OF PHOTOGRAPHS THAT REPRESENTS A SINGLE HOLIDAY

(71) Applicant: PhotoSì S.p.A. Unipersonale, Riccione (IT)

(72) Inventor: Mainetti Andrea, Riccione (IT)

(73) Assignee: PhotoSi S.p.A Unipersonale, Riccione (IT)

(*) Notice: Subject to any disclaimer, the term of this patent is extended or adjusted under 35 U.S.C. 154(b) by 84 days.

(21) Appl. No.: 16/978,795

(22) PCT Filed: Feb. 22, 2019

(86) PCT No.: PCT/IB2019/051455
§ 371 (c)(1),
(2) Date: Sep. 8, 2020

(87) PCT Pub. No.: WO2019/171201
PCT Pub. Date: Sep. 12, 2019

(65) Prior Publication Data
US 2020/0409989 A1  Dec. 31, 2020

(30) Foreign Application Priority Data

Mar. 8, 2018 (IT) .................. 102018000003385

(51) Int. Cl.
*G06F 16/587* (2019.01)
*G06F 16/535* (2019.01)
(Continued)

(52) U.S. Cl.
CPC .......... *G06F 16/587* (2019.01); *G06F 16/532* (2019.01); *G06F 16/535* (2019.01);
(Continued)

(58) Field of Classification Search
CPC .... G06F 16/587; G06F 16/538; G06F 16/535; G06F 16/532
(Continued)

(56) References Cited

U.S. PATENT DOCUMENTS

2008/0133526 A1  6/2008 Haitani et al.
2013/0239063 A1* 9/2013 Ubillos ............... G06F 3/04845
715/838

(Continued)

FOREIGN PATENT DOCUMENTS

EP  2876564 A1  5/2015

OTHER PUBLICATIONS

Deligiannidis, L., et al., "Event Visualization in a 3D Environment", IEEE, Krakow, Poland, May 25-27, 2008, pp. 158-164.

*Primary Examiner* — Kimberly L Wilson
(74) *Attorney, Agent, or Firm* — Schott, PC.

(57) ABSTRACT

A process for the automatic selection of digital photographs from an archive includes the step of providing software programmed to perform at least the following steps and to perform them through such software: accessing an archive of digital photographs containing a plurality of digital photographs; setting a reference geolocation, referred to below as the "home" position; including in an identifiable selection the photographs that comply with at least the following conditions: they were taken at a spatial distance from the "home" position greater than or "greater than or equal to" a predetermined distance; and they were taken in a time sequence between each other during a timeframe where photographs taken at a distance that is less than or "less than or equal to" the predetermined distance from the "home" position are absent; preferably ordering the printing and/or archiving of the selection.

15 Claims, 3 Drawing Sheets

Figure 1:
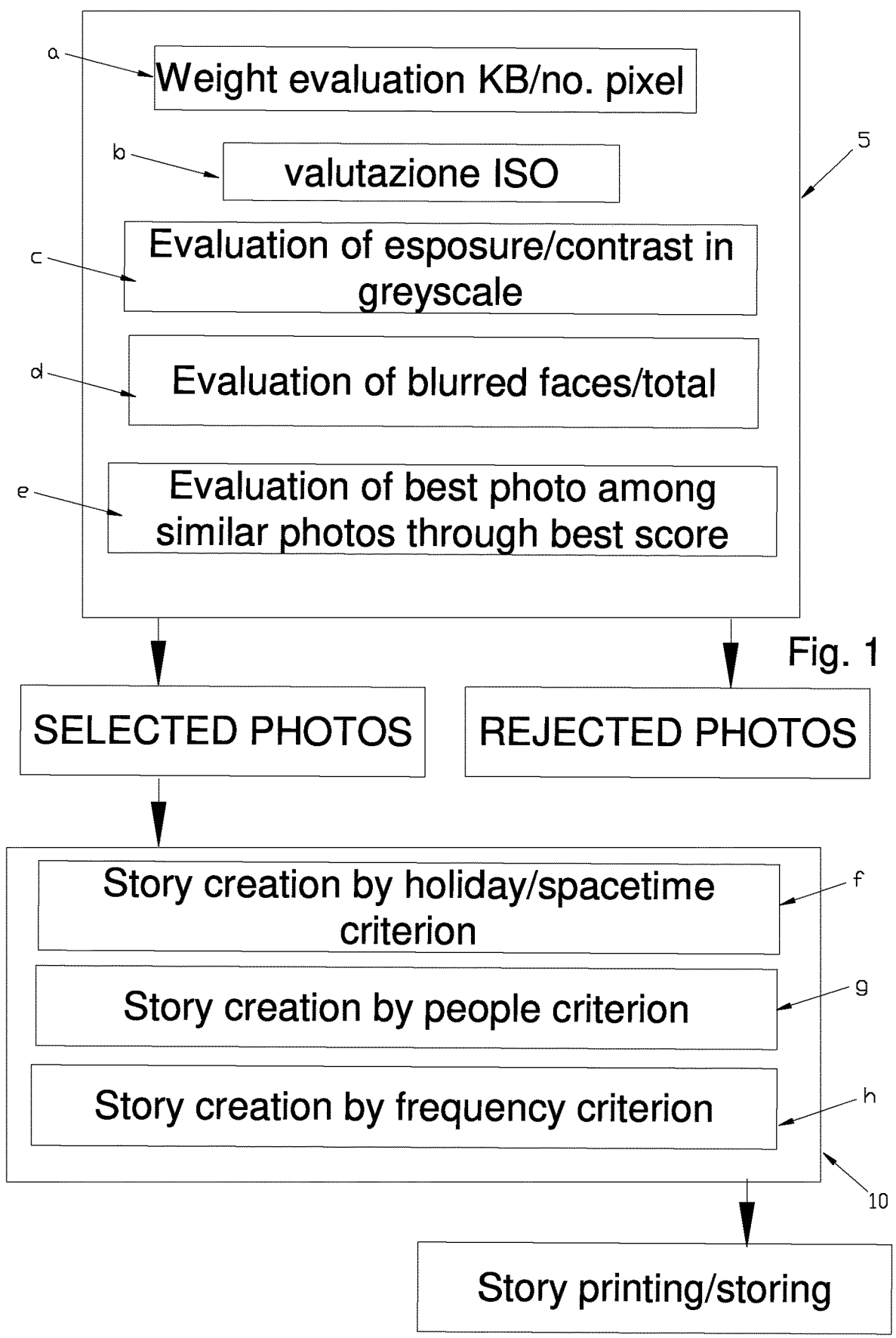

(51) Int. Cl.
   *G06F 16/532*   (2019.01)
   *G06F 16/538*   (2019.01)
   *G06K 9/62*     (2022.01)
   *G06T 5/00*     (2006.01)
   *G06V 10/98*    (2022.01)
   *G06V 40/16*    (2022.01)

(52) U.S. Cl.
   CPC ......... *G06F 16/538* (2019.01); *G06K 9/6215* (2013.01); *G06T 5/002* (2013.01); *G06V 10/993* (2022.01); *G06V 40/161* (2022.01)

(58) Field of Classification Search
   USPC ........................................................ 707/722
   See application file for complete search history.

(56) References Cited

U.S. PATENT DOCUMENTS

| | | | | |
|---|---|---|---|---|
| 2014/0093174 | A1* | 4/2014 | Zhang | G06F 16/5854 382/190 |
| 2015/0370888 | A1* | 12/2015 | Fonseca E Costa | G06F 16/4393 707/738 |
| 2018/0357506 | A1* | 12/2018 | Clarke | G06F 16/9537 |

\* cited by examiner

PROCESS FOR THE AUTOMATIC SELECTION OF DIGITAL PHOTOGRAPHS FROM AN ARCHIVE FOR THE AUTOMATIC CREATION OF A SELECTION OF PHOTOGRAPHS THAT REPRESENTS A SINGLE HOLIDAY

The present invention relates to a process for the automatic selection of digital photographs from an archive for the automatic creation of a selection of photographs that represents a single holiday. In fact, a holiday is the emotional story that is most commonly printed and/or kept.

A digital photograph means a static image converted into digital format and stored on a memory device. The image preferably comprises metadata, e.g. EXIF metadata, which comprise the taking date, the last modification date, the brand and model of the device that took the photograph, the geographical localisation data of the place in which the photograph was taken, the ISO sensitivity, the digital zoom, the analog zoom, etc.

The requirement of the invention mainly comes from the sector of printing photographs, where it is common practice to create personalised books with users' photographs. Each of such books has the aim of acting like an archive for a sequence of photographs to which the user gives an "emotional story" meaning, i.e. a sequence of photographs grouped according to a logic, that can vary from book to book. For example, the story can narrate a holiday, or a family event, etc.

Before the arrival of digital technology the need to create the sequence of photographs did not exist, as they were taken by the user almost exclusively during events to be remembered.

The arrival of digital cameras, and their practicality of use has increased the number of occasions in which users take photographs. This has led users to take and keep digital photographs also for events that are not interesting, i.e. such as not to take on the dignity of an "emotional story". We can call these photographs "noise" nesting in the digital photographic archive of a user. Therefore, with this technology the need arose to remove the "noise" from the printing of books.

To date this is left to the initiative of the user, who has to manually choose his/her photographs, collect them in a selection archive, and decide to print them.

It is observed that digital cameras have also brought with them an exponential multiplication of the number of photographs taken by each user, and therefore also a primary need to reject the photographs which, while having the dignity to be included in the story, are not good quality.

In current times, digital photography technology has become of "daily" enjoyment for anyone thanks to its integration in mobile telephones and smartphones, drastically increasing the number of problems related to identifying sequences of photographs with emotional story dignity, and rejecting poor quality photographs.

In fact, to date, the memory of each of these devices contains a number of such photographs, taken in continuation, which the user is no longer able to process manually, which means they fail to print the books or are even simply not able to relive the emotional story by looking at the archived photographs.

Therefore, the problem is also perceived if the user does not intend to print a book, but simply to select and archive his/her photographs in a logical way.

In the IT sector numerous applications are known for archiving images, but they are not intended for the creation of an "emotional story", rather they generate a subdivision into categories, often of free interpretation.

Systems are known in patent literature for automatically isolating photographs that belong to the same event, but they have the disadvantage that this is only possible if the event was previously registered as such in a different calendar application, to which the system has access. Examples are in US2008/133526 and EP2876564.

The application of NATIVO, known from US2015/0370888 is more interesting. Through this it is possible to automatically isolate photographs belonging to a holiday through a space criterion that chooses the photographs on the basis of the distance from the HOME position. After this choice, the application clusters the photographs of the holiday according to a time cluster, and derives from the "leaves" of the cluster the organisation of the photographs with which they are included in a presentation. However, the system is not optimal as it simply comprises photographs taken away from home, therefore they could belong to different holidays. The subsequent time clustering does not help in the automatic choice as it is only the subsequent cataloguing of photographs already considered to belong to a holiday through the sole filter of distance from home.

An object of the present invention is to overcome all or some of the drawbacks of the prior art.

A preferred object of the present invention is that of providing a process able to automatically define a single "holiday" narrated by a selection of photographs.

A further preferred object is to perform the process by providing an easy and reliable automatic recognition and separation criterion for the photographs that have the dignity of forming an "emotional story" and those that form "noise".

A further preferred object of the present invention is that of creating an "emotional story" formed by a selection of quality photographs.

According to a first general aspect, the present invention relates to a process for the automatic selection of digital photographs, comprising the step of providing software programmed to perform at least the following steps and to perform them through such software:

accessing an archive of digital photographs containing a plurality of digital photographs;

setting a reference geolocation, referred to below as the "home" position;

including in an identifiable selection the photographs that comply with at least the following conditions:

they were taken at a spatial distance from the "home" position greater than or "greater than or equal to" a predetermined distance; and they were taken in a time sequence between each other during a timeframe where photographs taken at a distance that is less than or "less than or equal to" the predetermined distance from the "home" position are absent;

preferably ordering the printing and/or archiving of the selection.

Advantageously, the process provides here a hybrid time/space criterion that is automatically applicable for selecting the photographs belonging to the same holiday, which we can consider the most statistically interesting ones from an emotional point of view and most frequently subject to printing in a photobook.

For example:

the software starts a new sequence by adding a first photograph, in taking time order, which was taken at a distance greater than or "greater than or equal to" the predetermined distance from the Home position;

subsequently the software evaluates the other photographs of the archive in taking time order, and adds to the selection the one being evaluated if it complies at least with the spatial distance from "home" condition of claim 1, otherwise it closes the selection, i.e. it concludes the story by not adding other photographs.

Preferably, the process is repeated, i.e. after the closure of a selection, the evaluation of the photographs continues in time sequence based on the taking date to create one or more other selections with the same criterion with subsequent photographs to those of the closed selection.

To increase the probability of recognising photographs belonging to the same holiday, it is possible to envisage that the software includes the photographs in a same selection if they were taken by the same photographic device. This can be done for example by reading from the metadata of the photographs the brand and model of the device with which they were taken, and by including in the selection only those with the same brand and model of the first photograph included in the selection.

Additionally or alternatively the software can include the photographs in a same selection if they have a geolocation that indicates that they were taken within a predetermined spatial distance from at least one photograph already included in said selection that has in turn a geolocation. This can be performed for example by reading the geolocation of the photographs from the metadata.

When the second criterion is applied in association with the first, it prevents photographs taken from the same device but in very distant places from each other and therefore probably not belonging to the same holiday from being grouped into the same selection. When, instead, the second criterion is applied without applying the first criterion, it allows photographs of the same holiday taken in nearby places with different devices to be grouped into the same selection.

The two criteria can be further refined by considering as a further inclusion condition of photographs in the same selection that of having been taken within a time distance from at least one photograph already included in the selection less than or equal to a predetermined time.

The recognition of the selection as a story can preferably be performed by identifying it as a valid selection if it has a number of photographs "greater than or equal to" a predetermined minimum number of photographs. This can be performed for example by labelling it with a recognition label.

According to some preferred embodiments, the process comprises the step of stopping adding photographs to a selection when at least one condition selected from the following occurs:
- the selection has reached a maximum number of photographs allowed by the application; this limit is for example set by the capacity of a possible photobook that is to be printed;
- the photograph that was taken at later date than the last one included in the selection was taken at a spatial distance from the "home" position that is less than or "less than or equal to" the threshold value; in that case such photograph confirms the return home and therefore the end of the holiday;
- the timeframe during which the photographs of the selection were taken has reached a predetermined fixed limit. This is useful, for example, if photographs were only taken on holiday, and in a reduced number, to prevent them being mixed as though they belonged to a single holiday. The fixed time limit could therefore be a time limit that reasonably coincides with the maximum duration of a holiday, e.g. 3 weeks.

According to some preferred embodiments, the process comprises the step of including in a selection a number of photographs that exceeds the number allowed by the previous conditions when the following exception occurs:
all the photographs taken in a period of time in which a higher number of photographs than a predetermined threshold are taken, are included if one or more of them would be included and others excluded from the selection by the previous conditions.

This advantageously allows emotionally intense sequences of photographs to be prevented.

According to a general preferable characteristic of the invention, the process comprises the step of creating a plurality of selections of different types from each other, where a first type is created by inserting the photographs according to the previous conditions, and the one or more of the other types are created by including photographs according to at least partially different conditions from the previous ones.

In that case, for example, it is possible to envisage the step of creating a further type of selection by including the photographs of the archive according to the following conditions:
- they contain at least one face belonging to the same person; this can be performed for example by comparison with a library, e.g. belonging to the open-source library OPENCV.

Additionally or alternatively, it is possible to envisage the step of creating a further type of selection by including the photographs of the archive according to the following conditions:
- they were taken at a distance from the "home" position less than or "less than or equal to" the predetermined distance; and
- they were taken in a timeframe where there is a number of photographs greater than or "greater than or equal to" a limit threshold.

Additionally or alternatively, it is possible to envisage the step of creating a further type of selection by including the photographs of the archive according to the following conditions:
- they have not been included in any selection created at least with the criterion of claim 1 (holiday criterion);
- they were preferably taken at a distance from the "home" position less than or "less than or equal to" the predetermined distance.

In this way it is possible to create a selection of ordinary general life that excludes holidays; such selection can, for example, cover a predetermined period such as, for example a month or a year, preferably allowing a predetermined minimum number of photographs to be reached and a maximum predetermined number of photographs not to be exceeded in the case that the intention is to print the selection.

In general, it is preferable to evaluate the photographs in time sequence and to include a photograph in a selection when the photograph being evaluated complies with the selection criteria. After the closure of a selection, it is preferably possible to continue the evaluation of the photographs in time sequence based on the taking date and create one or more other selections with the same criterion with subsequent photographs to those of the closed selection. The same photograph can preferably be included in various sequences generated with different criteria.

According to some preferred embodiments of the invention, the photographs are included in a selection only if they have not previously been rejected by a quality evaluation process.

The quality evaluation process preferably comprises at least the following evaluation criterion of the exposure and the contrast in greyscale:

- the photograph is converted into greyscale and the intensity diagram of the photograph converted into greyscale is calculated;
- a predetermined initial intensity interval and a final intensity interval of the diagram are identified;
- if in the initial interval and/or the final interval there is a total percentage of pixels of the photograph greater than or "greater than or equal to" a predetermined threshold, the contrast is evaluated.
- if the contrast of the photograph converted to greyscale is < or <=a predetermined threshold, the photograph is rejected and cannot be included in a selection.

Greyscale is a quantisation in discrete values of the intensities of grey, the discrete values are known as levels of grey. The scale can for example have 256 levels of grey.

Additionally or alternatively the quality evaluation process comprises at least the following process for selecting the best photograph from similar photographs:

- grouping the photographs into similar groups (i.e. groups with a similar subject, e.g. based on the comparison of the subject with similarity libraries);
- within each similarity group, calculating a score for each photograph by algebraically summing a plurality of predetermined characteristic values thereof,
- selecting the photograph with the highest score and rejecting the others that cannot thus be included in a selection Additionally or alternatively the quality evaluation process comprises at least the following:

- if the weight in KB is < or <=a predetermined threshold value "or" the number of pixels is < or <=a predetermined threshold value, the photograph is rejected and cannot be included in a selection.

Additionally or alternatively the quality evaluation process comprises at least the following:

- if the ISO value is outside a predetermined range of values the photograph is rejected and cannot be included in a selection.

Additionally or alternatively, characterised in that the quality evaluation process comprises at least the following criterion for evaluating the blurring in greyscale:

- the photograph is converted into greyscale
- if the photograph has at least one face: the percentage of area occupied by the rectangles of the faces in the photograph is determined and a blurring limit threshold proportional to the size of the rectangles is established;
- if all the faces have blurring greater than or "greater than or equal to" the limit threshold, the photograph is rejected and cannot be included in a selection;
- if the photograph does not have any faces, the overall blurring of the photograph is determined with respect to a predetermined threshold, if the overall blurring is greater than or "greater than or equal to" the predetermined threshold value the photograph is rejected and cannot be included in a selection.

The rectangles for example are the smallest rectangles into which a face can be inscribed and/or are determined through a library.

According to a second general aspect, the invention comprises software programmed to perform the steps of the process according to any one of the preceding claims.

Figure 2:
Figure 3:
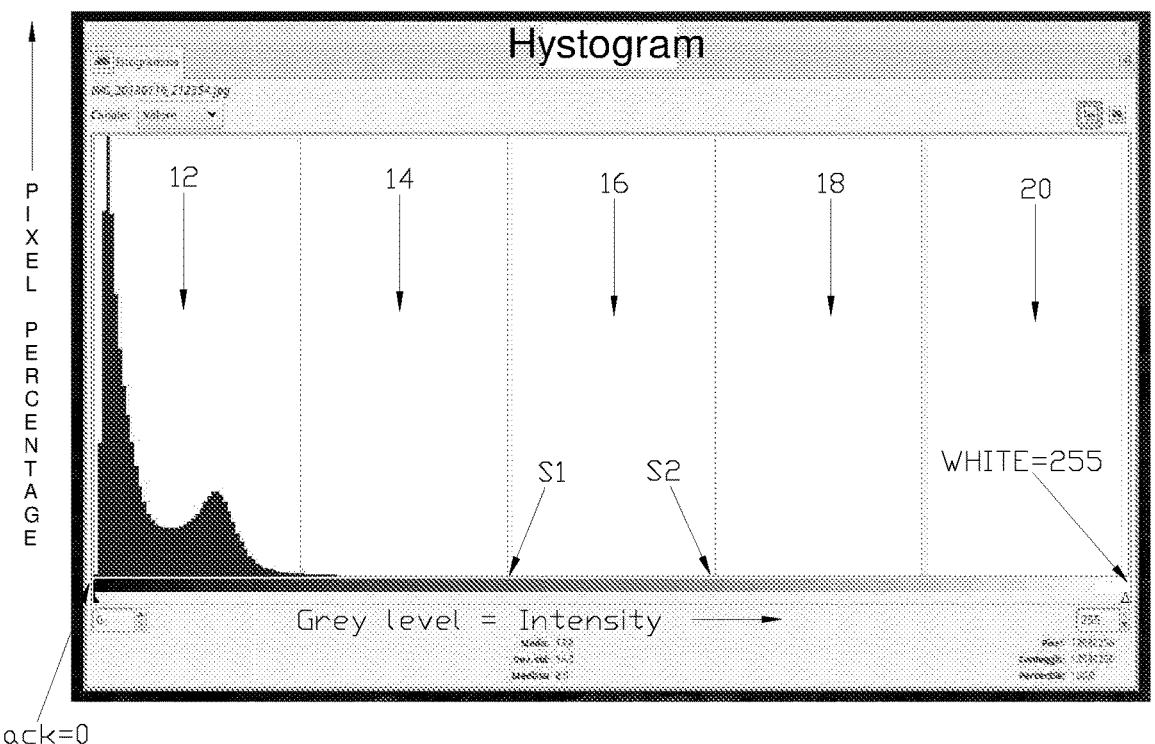
Figure 4:
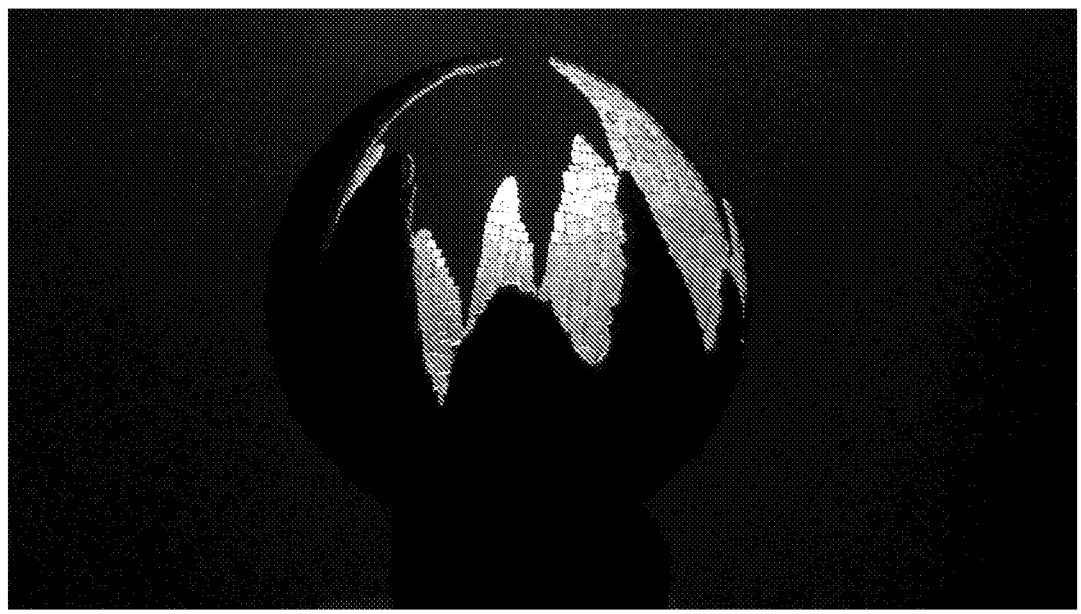
Figure 5:
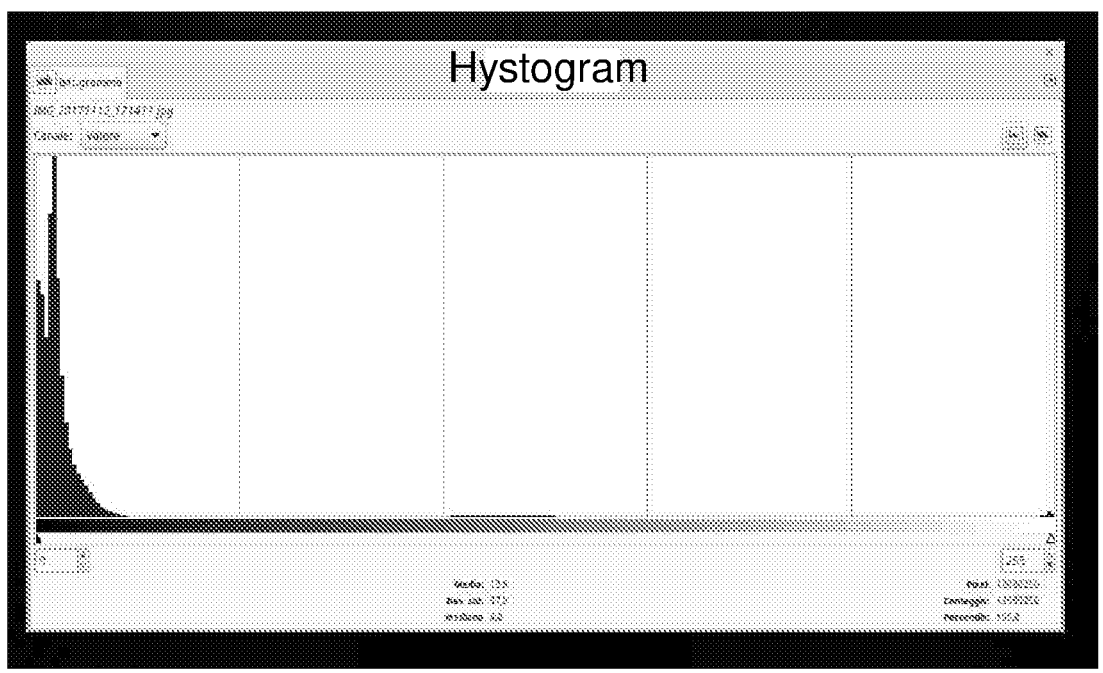

Further characteristics and advantages of the present invention will become clearer from the following detailed description of the preferred embodiments thereof, with reference to the appended drawings and provided by way of indicative and non-limiting example. In such drawings:

FIG. 1 represents a block diagram of a process implemented by a software application according to the present invention;

FIG. 2 represents a dark photograph that is rejected by the process according to the invention, and FIG. 3 represents the intensity diagram of the photograph of FIG. 2 converted into greyscale; and FIG. 4 represents a dark photograph that is selected by the process according to the invention as it has sufficient contrast, and FIG. 5 represents the intensity diagram of photograph 4 converted into greyscale.

With reference to FIG. 1, a process is illustrated, which can be automatically implemented by a software application, to create and print, and/or archive, a story represented by a selection of digital photographs taken from an archive.

The digital archive is for example the memory of a smartphone, and contains many photographs. Most of them are probably not suitable for printing, therefore the first requirement is to reject the unsuitable ones.

For that purpose, the application accesses the archive and performs the first photograph quality evaluation, indicated overall with reference number 5. The evaluation can be performed, for example, through one or more of the following criteria, in the same selection illustrated, or in a different selection:

a) photograph weight and/or size evaluation criterion: if the weight in KB is < or <=a predetermined threshold value "and/or" the number of pixels is < or <=a predetermined threshold value, the photograph is rejected;

b) ISO value evaluation criterion: if it is outside a predetermined range of values the photograph is rejected;

c) exposure and contrast evaluation criterion in greyscale:

- the photograph is converted into greyscale and the intensity diagram of the photograph converted into greyscale is calculated;
- In general, the greyscale goes from black to white, and it is preferably a standard type scale, e.g. a scale on 256 levels of grey (each level corresponds to an intensity of grey).
- A predetermined initial intensity interval and a final intensity interval of the diagram are identified. These intervals therefore comprise the darkest and lightest grey levels of the scale. The intervals preferably start and finish at the extremes of the diagram.
- If in the initial interval and/or the final interval there is a total percentage of pixels of the photograph greater than or "greater than or equal to" a predetermined threshold, the contrast is evaluated. In fact, these photographs could be overexposed or underexposed, i.e. too light or too dark, but they could also be night-time photographs or photographs in full light exposed correctly, therefore an automatic process is necessary to establish their condition.
- if the contrast of the photograph converted to greyscale is < or <=a predetermined threshold, the photograph is rejected. It is observed that the contrast preferably considered is calculated from all the pixels of the image minus a predetermined quantity of the lighter and/or darker pixels. A contrast calculated as the difference between the intensity of the lighter pixels and the intensity of the darker pixels from among all the pixels could in fact cause an error in which there is a not very significant number of very light or very dark pixels, known as "noise". Rejecting a predetermined quantity of lighter and darker pixels from the evaluation allows the elimination of the noise. In particular, an equal quantity to a predetermined percentage of total pixels of the image are rejected from the contrast evaluation.

With reference to FIGS. 2 and 3, a specific example is provided of the evaluation of a dark photograph that is rejected by the process according to the invention. The photograph is a night-time landscape.

The evaluation starts by converting the image of FIG. 2 into greyscale, where the scale is of the standard type and contains 256 levels of grey.

The evaluation proceeds by calculating, for the photograph converted into greyscale, how many pixels are darker than a predetermined threshold, in particular as a percentage of pixels, of the total pixels of the image, and darker than a predetermined grey threshold level.

This can be done for example by constructing a diagram, preferably in the form of a histogram, of the image in greyscale, represented in FIG. 3.

The diagram shows on the horizontal axis the 256 levels of grey and on the vertical axis the number of pixels (or the percentage of total pixels) present in the photograph for each level of grey.

The levels of the greyscale are split into five intervals of values, indicated by numbers 12, 14, 16, 18, 20, comprised between 0 (black) and 255 (white).

Darker pixels are those that have intensity values that fall within the first two intervals 12 and 14, therefore values comprised between 0 and 101. In other words, the threshold grey level here is the level S1=101 which constitutes the upper limit of the interval 14.

In the example 98.8% of the total pixels of the photograph fall within intervals 12 and 14.

If this interval exceeds a predetermined threshold value it is necessary to proceed to evaluate the contrast of the photograph. For this example we use the following predetermined threshold value: parameter 1=75%, therefore the photograph is potentially underexposed and the evaluation is performed with the following steps.

The image contains both at least one white pixel and at least one black pixel, in particular 8 white pixels and 14072 black pixels, therefore the absolute contrast value would be the difference between the intensity value of the black and of the white, i.e. 255−0=255. However, the perception of the human eye is that the photograph has a decisively lower contrast.

To eliminate the "noise" the contrast of the darker and lighter pixels is removed from the calculation to an extent determined by a predetermined threshold value; in the example we use parameter 2=2%. The image has 12080256 pixels and 2% is equal to 241605 pixels. On one hand, we look in the histogram for the smallest intensity value for which there are at least 241605 darker pixels. In our case this is the intensity value 2, very close to black. Likewise, we look in the histogram for the highest intensity value for which there are at least 241605 lighter pixels. In our case this is the intensity value 42, also a rather dark value. Therefore, the contrast net of the noise, most in line with the contrast perceived by the human eye, is equal to 40. If this value is lower than a predetermined threshold then the photograph is overexposed and is rejected. In the example, we use as the contrast threshold value the parameter 3=125, therefore the photograph in question is rejected.

With reference to FIG. 4 a photograph is shown that represents a work of art in a dark environment, illuminated by a source inside the work itself. The photograph has the same dimensions as the previous one.

By adopting the same process and the same parameters as the photograph of FIG. 2, the histogram of the photograph of FIG. 5 converted into greyscale is obtained.

In particular, 94.8% of the pixels fall within the first two intervals 12 and 14 and therefore the photograph is potentially underexposed.

However, net of the noise determined through parameter 2, the minimum intensity value is equal to 1 while the maximum intensity value is equal to 169 and therefore the perceived contrast, equal to 168, is sufficiently high (>=parameter_3) and the photograph is not rejected.

The same process takes place for potentially overexposed photographs (very light), i.e. those in which the percentage of pixels has an intensity value greater than a predetermined threshold level (>=parameter_1). This percentage is for example the one that falls within the last two intervals (18, 20) therefore the potential overexposure intensity threshold value is the lower end S2=152 of the interval 18.

To summarise in general, in the evaluation we used the following parameters:
parameter_1: e.g. 75% (potential underexposure and/or overexposure threshold)
parameter_2: e.g. 2% (rejection threshold of pixels that do not fall within the contrast calculation)
parameter_3: e.g. 125 (contrast threshold net of noise)

d) blurring evaluation criterion. A preferred criterion is the following:
- the photograph is converted into greyscale and an equalisation is preferably performed, e.g. according to a known standard process;
- the frontal and profile faces in the photograph converted into greyscale and equalised are detected, using comparison with a library, e.g. the known open-source software "OPENCV". The detections preferably take place both on the image with the original orientation, and on the image rotated according to at least a second orientation, e.g. according to one or more of: rotated left through 90°, rotated right through 90° and rotation through 180°. Both the presence of the eyes (one or both) and the smile are preferably identified.
- If the photograph has at least one face: the percentage area occupied by the rectangles of the faces in the photograph is determined. A blurring limit threshold is established, proportional to the size of the rectangles. If all the faces have blurring greater than or "greater than or equal to" their own limit threshold, the image is rejected. The rectangles for example are the smallest rectangles into which a face can be inscribed and/or are determined through a library.
- If the photograph does not have any faces, the overall blurring of the photograph is determined with respect to a predetermined threshold, if the overall blurring is greater than or "greater than or equal to" the predetermined threshold value the photograph is rejected.

e) Criterion for the choice of the best photograph from similar photographs. There will almost certainly be photographs present in the archive taken of the same subject in successive attempts, with the intention of having at least one quality photograph. It is therefore necessary to automatically select "only one of these photographs", naturally the best. This can be done as follows.
- The application initially groups the photographs into similarity groups (i.e. photographs with a similar subject).

To establish the similarity of the photographs the application preferably compares them using libraries, e.g. using a known algorithm, e.g. an algorithm belonging to the known open-source library OPENCV.

Preferably, a photograph being evaluated is included in a similarity group if it was taken by a device of the same brand and model as the others in the group "and" if it was taken within a time limit predetermined by the last photograph included in the group.

If a photograph cannot be included in a similarity group already created, or if not enough similarity groups exist yet, it is included in a new similarity group.

When there are no more similar photographs to include in a group that comply with the requirement of being taken within the time limit, the group is closed, i.e. no more photographs are included.

Inside each closed similarity group the photograph is selected with the highest quality score, and the others are rejected. The quality score may preferably be calculated for each photograph as follows: for each photograph the application algebraically sums a plurality of predetermined characteristic values thereof, where the values are preferably selected from: width of the photograph in pixels, height of the photograph in pixels, ISO sensitivity, focus value, digital zoom value, analog zoom value, sum of percentages occupied by faces if present (preferably assigning a greater percentage to the frontal faces with both eyes, or with both eyes open, or with a smile). The focus can be calculated e.g. through known libraries. According to simpler embodiments the values are selected from the available metadata only.

Some of these values are obtained from previous evaluations, others are present in the metadata of each photograph. Preferably, the application is able to evaluate the metadata of the most common type, i.e. EXIF type metadata, but it is not excluded that alternative metadata are evaluated such as, for example, XMP or the like.

If the photograph is not rejected by at least one of the previous criteria adopted, it assumes the status of selected photograph and is used in the subsequent story creation algorithm, indicated overall with reference number 10 in FIG. 1.

For example, the photographs not rejected by the quality evaluation 5 are included in a group or in a new archive which the story creation algorithm accesses.

The algorithm can create one or more stories from the photographs selected through one or more criteria. The preferred criteria are as follows.

f) HOLIDAY CRITERION—The main stories to be remembered are statistically those connected to holidays, for which there is a need to create a criterion that identifies them automatically. This can be done for example as follows:
the application is programmed to preliminarily set a reference geolocation, referred to below as the "home" position;
the story is created by grouping to form a story, i.e. a selection of photographs identified as such, the photographs selected in the previous steps that:
were taken at a spatial distance from the "home" position greater than or "greater than or equal to" a predetermined distance; and
were taken in a time sequence between each other during a timeframe where photographs taken at a distance that is less than or "less than or equal to" the predetermined distance from the "home" position are absent;

A further preferable but not compulsory condition for inclusion in the story may be that of having been taken by the same device; this prevents for example unrelated photographs, such as those coming from social applications like Whatsapp and Facebook or downloaded from the internet, from being included in the story. Additionally or alternatively the software can include the photographs in a same selection if they have a geolocation that indicates that they were taken within a predetermined spatial distance from at least one photograph already included in said selection that has in turn a geolocation. This can be performed for example by reading the geolocation of the photographs from the metadata. When the distance criterion is applied in association with the criterion of taking from the same device, it prevents photographs taken from the same device but in very distant places from each other and therefore probably not belonging to the same holiday from being grouped into the same selection. When, instead, the second criterion is applied without applying the first, it allows photographs of the same holiday taken in nearby places with different devices to be grouped into the same selection. The two criteria can be further refined by considering as a further inclusion condition of photographs in the same selection that of having been taken within a time distance from at least one photograph already included in the selection less than or equal to a predetermined time.

If the at least one resulting selection has a number of photographs that is greater than or "greater than or equal to" a minimum predetermined number of photographs, the selection is definitively identified as a story and the application is preferably adapted to place in order the printing of said selection of photographs.

Preferably, the application stops adding photographs to the selection of a story when one of the following conditions occurs:
the selection has reached a maximum number of photographs allowed by the application; it is not excluded that the maximum number coincides with the minimum number for recognising the selection as a story.
or the photograph that was taken at later date than the last one included in the selection was taken at a spatial distance from the "home" position that is less than or "less than or equal to" the threshold value. This "threshold photograph" in particular identifies that the subject returned home, and therefore defines the end of the holiday.

A further preferable condition of interruption of the selection could be when the timeframe during which the photographs of the selection were taken has reached a predetermined fixed limit allowed by the application. In the event that the user has only taken photographs away from home, and therefore there is no "threshold photograph" it prevents photographs from different holidays ending up in the selection.

According to a preferred example, the application starts a new selection by adding the first photograph, in taking time order, which was taken at a distance greater than or "greater than or equal to" the predetermined distance from the Home position. Subsequently it evaluates the other photographs in order of when they were taken, therefore if the one being evaluated still complies with the spatial distance requirements, and the selection still has not reached the maximum limit of acceptable photographs, it adds it, otherwise it closes the selection, i.e. it concludes the story by not adding other photographs.

It could be however that these rules end up interrupting the story in an undesired way, especially at a photographically very intense part, defined by a so-called "shock" of photographs, i.e. a period in which many photographs were taken, in other words a period with a high "taking frequency". This period identifies an interesting part of the story and cannot be truncated, therefore the photographs belonging to a period with a taking frequency that is greater than or "greater than or equal to" a predetermined threshold are included in the selection even if this goes beyond the allowable photograph limit number.

The recognition of the photographs belonging to a "high taking frequency period" can be performed by comparing the time that passed between the photograph being evaluated and the last photograph included in the selection, if it is less than or "less than or equal to" a predetermined threshold, the photograph is included in the selection.

When a story is closed, it is possible to repeat the algorithm to create others, where the subsequent story began by choosing the first photograph from among those not used in the stories previously selected with the same criterion.

g) PEOPLE CRITERION: it is possible to create the personal story of an individual by identifying from all the photographs containing faces, those belonging to the same person. This can be done by comparison with a library, e.g. the open-source library OPENCV.

Preferably, this criterion can include in its selections also photographs included in selections created with other criteria, such as the previous criterion.

h) TAKING FREQUENCY CRITERION: Photographs not belonging to the holiday, as they were not taken far from home, but belong to particularly significant events, will almost certainly be included in the archive. It is possible to group them into a story by recognising them based on the taking frequency. In particular, if in a preferably predefined timeframe, there is a number of photographs greater than or "greater than or equal to" a limit threshold "and" taken at a distance from the "home" position less than or "less than or equal to" a threshold value, they are grouped into a selection that represents a story.

i) GENERAL LIFE CRITERION: all the photographs that were included in the selection of a story by at least one of the previous criteria that was adopted, preferably the holiday criterion, can be included in a general story selection, which ends when it reaches a predetermined limit number of photographs or a predetermined timeframe during which the photographs were taken.

According to a preferable general characteristic of the invention, the same photograph can be included in numerous selections obtained with different criteria, however the opposite, less preferred case, is not excluded, in which the photographs are included in a further type of selection only, not yet included in another selection.

According to another preferable general characteristic, it is possible to repeat a same criterion to create more selections, in which case it is envisaged at least for one or more criteria, such as the criterion for holiday selections, that the photographs of the new selections that belong to the same criterion are only included if they have not already been included in another selection generated with the same criterion.

For example, this is feasible by providing that a predetermined criterion for the creation of selections processes the photographs in a time sequence based on the taking date, therefore a photograph already processed by said criterion may not be processed again according to the same criterion.

According to a further general preferable characteristic of the invention, each type of criterion for the creation of selections processes all the photographs in a time sequence based on the taking date. This easily allows the same photograph to be included in selections obtained with different criteria, as each photograph is evaluated by all the criteria.

In general we observe that the invention also envisages the, less preferred, possibility that the story creation algorithm 10 is applicable independently from the quality evaluation 5, and therefore creates stories by selecting the photographs from among all those of the archive, or from those of the archive positively evaluated with a different method from the evaluation 5.

In general, the contrast/exposure evaluation criteria and/or the blurring criterion and/or the criterion of selecting the best photograph from similar photographs are applied after at least one other photograph quality evaluation criterion and only to photographs not rejected by such previous criterion.

In general the application is able to put the printing in order and/or allow the archiving and recovery of all the stories created. The printing is for example put in order by internet connection to a remote printing provider with respect to the device on which the application is installed. The provider is for example a photograph book printing industry.

Although the process has been described herein in the form of a software application installed or installable in a mobile device, such as a smartphone or digital camera, other types of application or software are not excluded. In general, it is further not excluded that the digital archive that the software can access is in an internal memory of the hardware device in which the software is installed such as, for example, a hard disk, and/or an external memory such as, for example, a SIM card, or a cloud environment.

In general, all the solutions deriving from the exchange between the terms greater and "greater than or equal to", and less and "less than or equal to", are contemplated between > and >=, between < and <=. In other words, all the solutions generated by any combination of these terms are contemplated.

In general the greyscale is any quantisation of the intensity of the greys in predetermined grey levels. Grey levels are discrete values spread across a scale. The scale can for example have 256 levels of grey, which can therefore also be called grey intensities.

The grey scale can for example refer to the classical 8-bit binary representation for pixels, which allows 256 levels of grey intensity to be represented, including pure black, generally corresponding to level 0, and pure white, generally corresponding to level 255.

Naturally, the embodiments and variants described and illustrated up to now are for purely exemplifying purposes and a person skilled in the art, to satisfy specific and contingent requirements, can make numerous modifications and variants, including for example the combination of said embodiments and variants, all actually contained within the scope of protection of the present invention as defined by the following claims.

The invention claimed is:
1. Process for automatic selection of digital photographs from an archive, comprising the step of providing software programmed to perform at least the following steps and to perform them through such software:

accessing an archive of digital photographs containing a plurality of digital photographs;

setting a reference geolocation as a home position;

including in an identifiable selection the digital photographs that comply with at least the following conditions:
  taken at a spatial distance from the home position greater or greater than or equal to a predetermined distance; and
  taken in a time sequence between each other during a timeframe where digital photographs taken at a distance that is less than or less than or equal to the predetermined distance from the home position are absent;

wherein the digital photographs are included in a sequence only if the digital photographs have not previously been rejected by a step for evaluating quality;

evaluating quality according to at least the following criterion for evaluating exposure and contrast in greyscale:
  the digital photograph is converted into a converted greyscale photograph and an intensity diagram of the converted photograph is calculated;
  a predetermined initial intensity interval and final intensity interval of the intensity diagram are identified;
  if in the initial interval and/or the final interval there is a total percentage of pixels of the converted photograph greater than or greater than or equal to a predetermined threshold, contrast is evaluated;
  if the contrast of the converted photograph is < or <=a predetermined contrast threshold, the digital photograph is rejected and cannot be included in a sequence.

2. Process according to claim 1, wherein
the software starts a new sequence by adding a first digital photograph, in taking time order, which was taken at a distance greater or greater than or equal to the predetermined distance from the Home position;
subsequently the software evaluates the other digital photographs of the archive in taking time order, and adds to a selection the digital photograph being evaluated if digital photograph complies at least with the spatial distance from home condition, otherwise the software closes the selection and adds no other photographs.

3. Process according to claim 2, wherein after the closure of a selection, the software continues the evaluation of the digital photographs in time sequence based on a date photographs is taken and creating one or more other selections with the conditions with subsequent digital photographs to those of the closed selection.

4. Process according to claim 1, wherein the software includes the digital photographs in a same selection if the digital photographs were taken with the same photographic device and/or were taken within a predetermined distance from at least one digital photograph already included in said selection.

5. Process according to claim 4, further comprising an inclusion condition of photographs in the same selection that of having been taken within a time distance from at least one digital photograph already included in the selection less than or equal to a predetermined time.

6. Process according to claim 1, further comprising the step of:
  identifying the selection through the software as a valid selection if the selection has a number of digital photographs greater than or greater than or equal to a predetermined minimum number of digital photographs.

7. Process according to claim 1, wherein a step of stopping adding digital photographs to a selection when at least one condition selected from the following occurs:
  the sequence has reached a maximum number of digital photographs allowed by the software;
  the digital photograph that was taken at later date than the last digital photograph included in the sequence was taken at a spatial distance from the home position that is less than or less than or equal to a predetermined value;
  a timeframe during which the digital photographs of the sequence were taken has reached a predetermined fixed limit.

8. Process according to claim 7, further comprising a step of including in a sequence a number of digital photographs that exceeds a number allowed by the previous conditions when the following exception occurs:
  all the digital photographs taken in a period of time, in which a higher number of digital photographs than a predetermined threshold are taken, are included if one or more of the digital photographs would be included and others excluded from the sequence by previous conditions.

9. Process according to claim 1, further comprising a step of creating a plurality of sequences of different types from each other, where a first type is created by inserting the digital photographs according to previous conditions, and the one or more of the other types are created by including digital photographs according to at least partially different conditions from the previous ones.

10. Process according to claim 9, wherein the step of creating a further type of sequence by including the digital photographs of the archive if the digital photographs contain at least one face belonging to a same person.

11. Process according to claim 9, further comprising a step of creating a further type of sequence by including the digital photographs of the archive that comply at least with the following conditions:
  have not been included in any sequence created at least with the conditions;
  taken at a distance from the home position which is less than or less than or equal to the predetermined distance.

12. Process according to claim 1, further comprising a quality evaluation process that includes at least the following process for selecting a best photograph from among similar photographs:
  grouping the digital photographs into similarity groups;
  within each similarity group, calculating a score for each digital photograph by algebraically summing a plurality of predetermined characteristic values thereof,
  selecting a digital photograph with the highest score and rejecting the others that cannot thus be included in a sequence.

13. Process according to claim 1, further comprising a quality evaluation process that includes at least the following condition:
  if the weight in kilobytes (KB) is < or <=a predetermined threshold value or the number of pixels is < or <=a predetermined threshold value, the digital photograph is rejected and cannot be included in a sequence.

14. Process according to claim 1, further comprising a quality evaluation process that includes at least the following condition:

if an International Organization for Standardization (ISO) value is outside a predetermined range of ISO values, the digital photograph is rejected and cannot be included in a sequence.

15. Process according to claim 1, further comprising a quality evaluation process that includes at least the following criterion for evaluating blurring in greyscale:

the digital photograph is converted into greyscale if the digital photograph has at least one face; a percentage of area occupied by rectangles of the at least one face in the digital photograph is determined and a blurring limit threshold proportional to a size of the rectangles is established; if all the at least one faces have blurring greater than or greater than or equal to the limit threshold, the digital photograph is rejected and cannot be included in a sequence;

if the digital photograph does not have any faces, blurring of the digital photograph is determined with respect to a predetermined blurring threshold, if the overall blurring is greater than or greater than or equal to the predetermined blurring threshold, the blurring photograph is rejected and cannot be included in a sequence.

\* \* \* \* \*